United States Patent [19]
Hunter et al.

[11] Patent Number: 5,325,881
[45] Date of Patent: Jul. 5, 1994

[54] SEISMIC VALVE

[76] Inventors: Donald B. Hunter, 1137 W. Yale, Ontario, Calif. 91762; William J. Cox, 545 E. Arrow Hwy., Pomona, Calif. 91767

[21] Appl. No.: 985,893

[22] Filed: Dec. 4, 1992

[51] Int. Cl.⁵ ............................................. F16K 17/36
[52] U.S. Cl. ........................................ 137/39; 137/45; 137/80
[58] Field of Search .................... 137/38, 39, 45, 80

[56] References Cited

U.S. PATENT DOCUMENTS

| | | | |
|---|---|---|---|
| 2,853,089 | 9/1958 | Bair | 137/39 |
| 3,842,852 | 10/1974 | Bair | 137/39 |
| 4,274,431 | 6/1981 | Keller | 137/45 X |

Primary Examiner—Robert G. Nilson
Attorney, Agent, or Firm—Albert O. Cota

[57] ABSTRACT

A seismic shut off valve includes a cripple column responsive to seismic movement. A toggle spring overlies the cripple column. Latch pins extend from the toggle spring into a valve body to hold a popper valve in an open position. During an earthquake, the cripple column buckles causing the toggle spring to bow upwardly under spring force exerted on the toggle spring through the latch pins from the popper valve. The latch pins release the poppet valve which shifts to seal against a valve seat in a valve body. A ball joint connecting the valve body and cripple column allow the cripple column to be vertically aligned despite use of the valve on a non-vertical pipe.

15 Claims, 8 Drawing Sheets

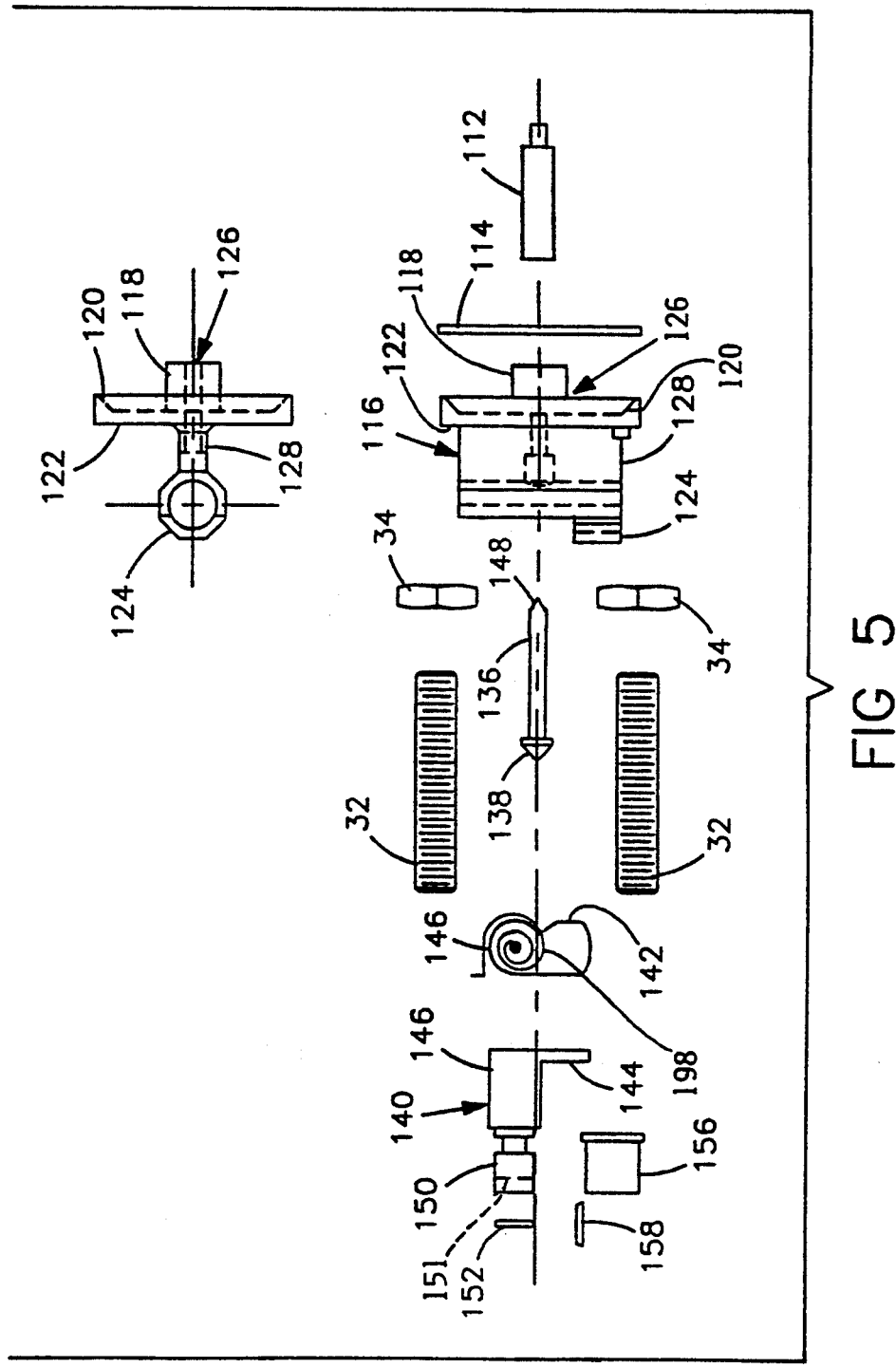

SEISMIC VALVE

The field of the present invention is seismic valves.

BACKGROUND OF THE INVENTION

Seismic valves are valves which automatically close and shut off flow of natural gas or other media during and after an earthquake. If pipes or fittings are cracked or broken by an earthquake, a seismic valve can shut off flow and prevent leakage to reduce the threat of explosion and fire. Seismic valves typically have pendulums, balls or other inertial elements which undergo relative movement with respect to other valve components, during an earthquake, to close the valve.

A disadvantage of many seismic valves is that the entire valve unit has to be level for the valve to properly operate. Consequently, the pipe (e.g., a natural gas pipe) on which the seismic valve is installed must be vertical plumb. In addition, certain seismic valves may inadvertently reopen if the valve body is rotated much beyond 45° from vertical, which rotation may occur when a building foundation collapses in an earthquake.

Certain seismic valves also have a large cover requiring a large seal area. In a fire, large seals can result in large gas leaks, an inherent potential safety problem. The large cover is also disadvantageously under media (e.g., gas) pressure when the valve is closed.

In various seismic valves, friction in pivot joints can cause tripping or closing of the valve at unintended seismic acceleration levels, i.e., the valve closes under unduly low levels of seismic shock and vibration, or it fails to close when it should at higher seismic movements. In addition, friction in pivoting or rotating joints in ball or plug type seismic valves may prevent complete closure of the valve. Certain prior art valves also incur relatively large pressure flow losses of gases or liquids through the valves, due to the valve configuration.

SUMMARY OF THE INVENTION

The present invention is directed to an improved seismic valve. To this end, a seismic valve has a cripple column pivotally attached to a valve body. A valve within the valve body is normally held open. During an earthquake or other like disturbance to the valve, the cripple column buckles. As a result, the valve is released and moves to a closed position creating a seal to stop flow.

Accordingly, it is an object of the present invention to provide an improved seismic valve. Other and further objects and advantages will appear hereinafter.

BRIEF DESCRIPTION OF THE DRAWINGS

In the drawings, wherein similar reference characters denote similar elements through the several views:

FIG. 5 is an exploded side elevation view of control components in the valve body of the present valve;

DETAILED DESCRIPTION OF THE PREFERRED EMBODIMENT

Figure 1:
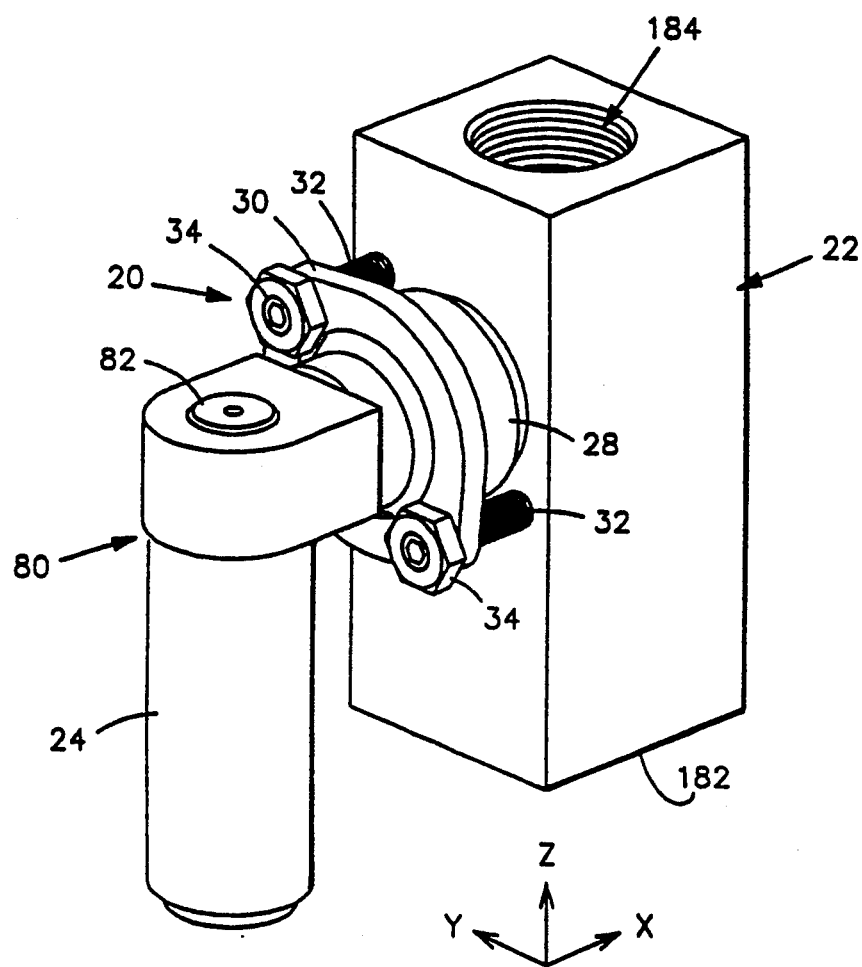
FIG. 1 is a perspective view of the present seismic valve.
Figure 3:
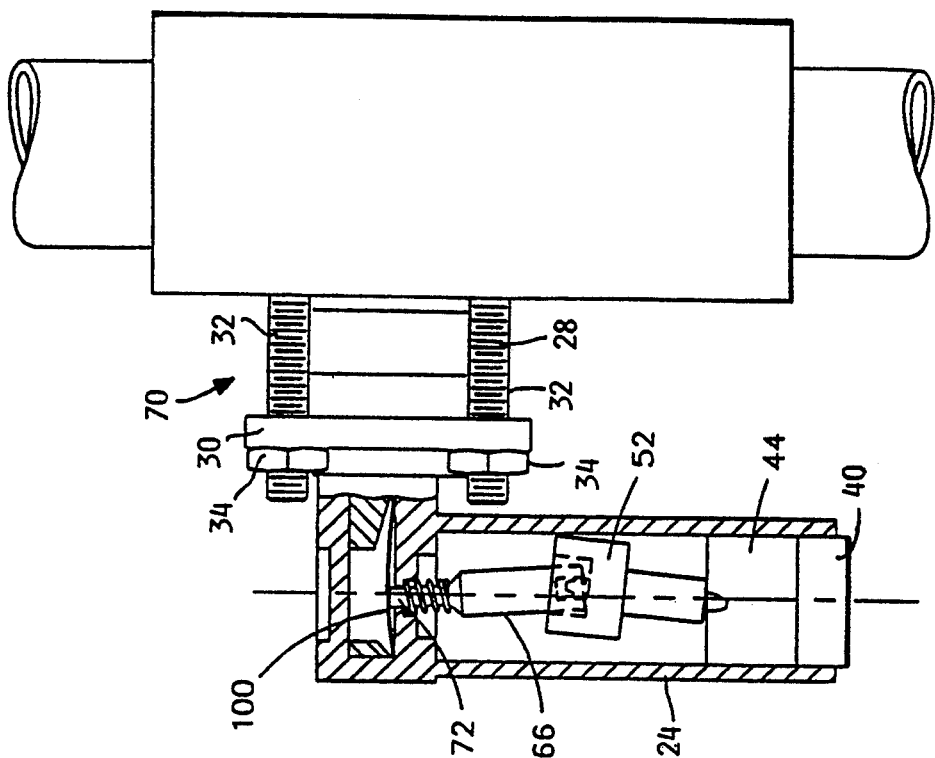
FIG. 3 is a side elevation view in part section of the valve of FIG. 1 showing the cripple column in a buckled condition.
Figure 2:
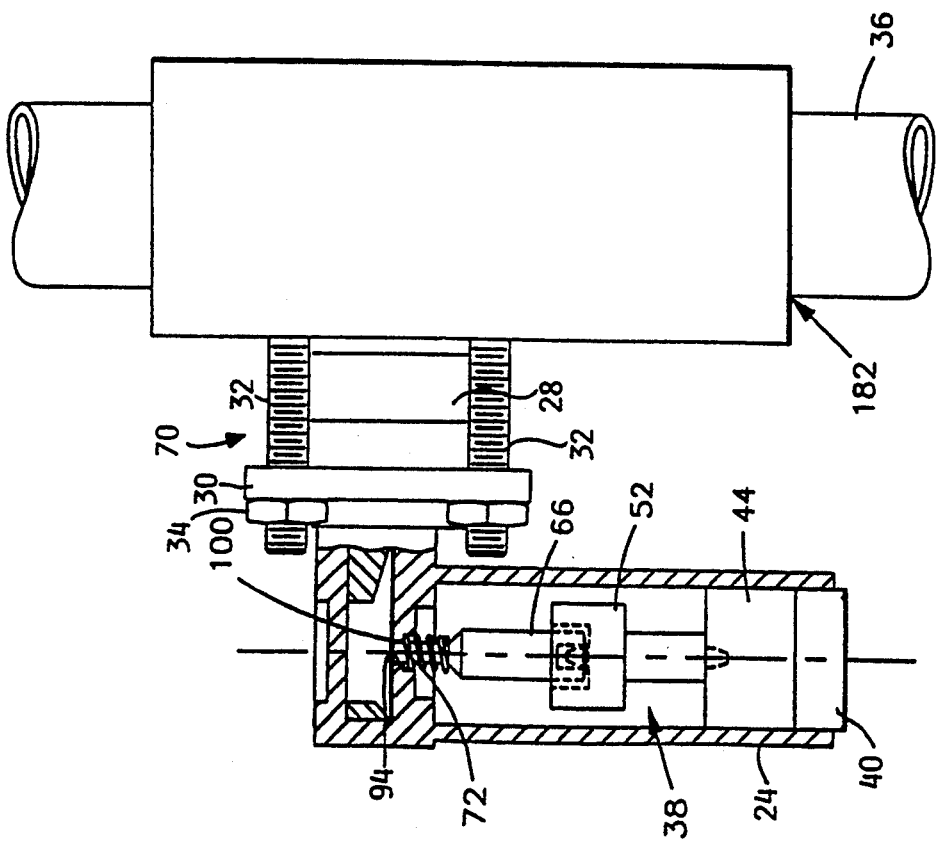
FIG. 2 is a side elevation view in part section of the valve of FIG. 1 showing the cripple column of the present invention in its centered, aligned or unbuckled condition.

Turning now to the drawings, as shown in FIGS. 1-3, the present valve unit 20 has a valve body 22 attached to a cripple column housing 24 by a ball section 28, a clamp ring 30, studs 32 and nuts 34. The valve body 22 has an inlet 182 and an outlet 184 for attachment to a pipe, e.g., a natural gas pipe.

Figure 4:
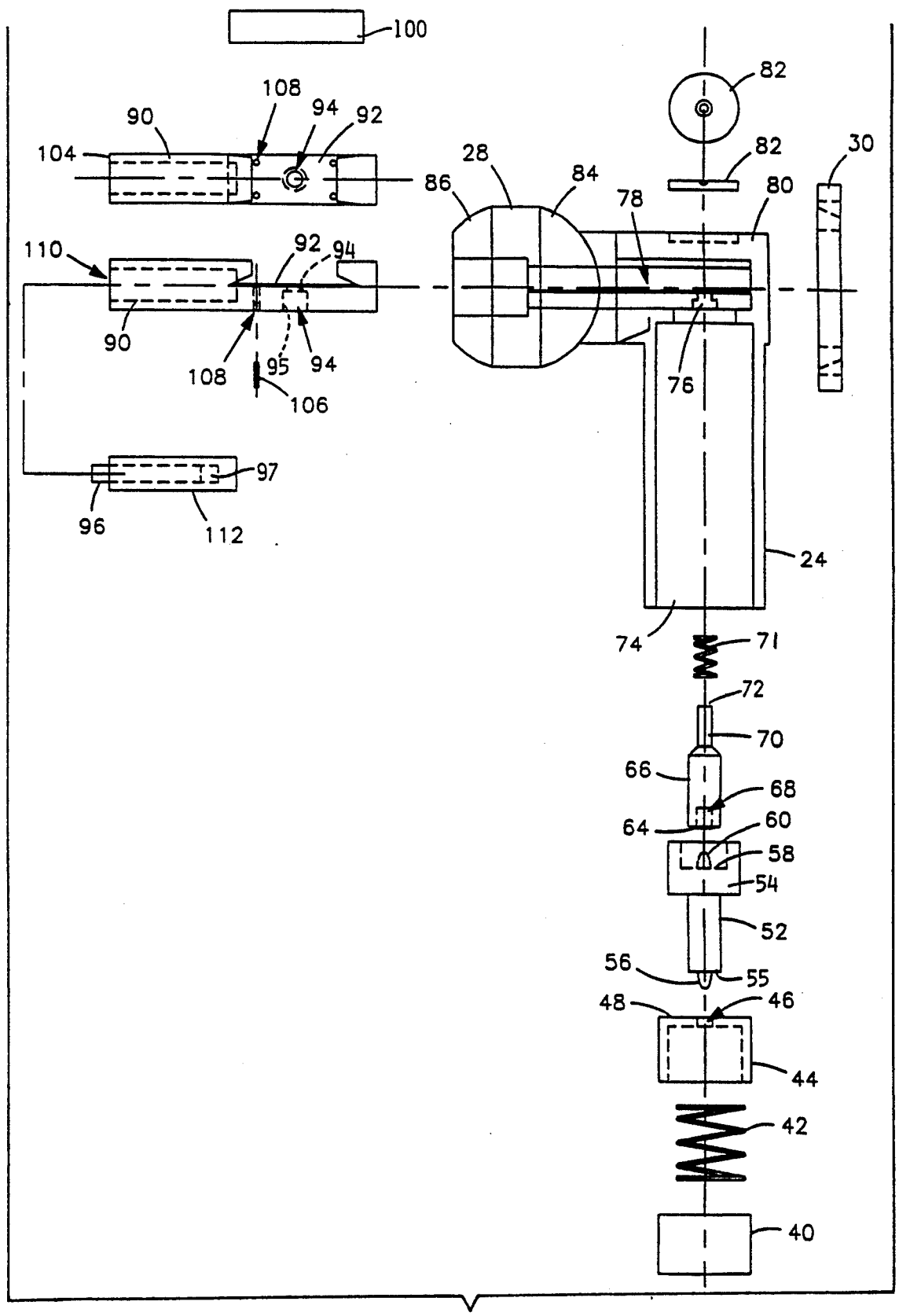
FIG. 4 is an exploded side elevation view illustrating the cripple column and toggle insert components of the present valve.

As shown in FIGS. 2-4, a cripple column 38 is provided within the cripple column housing 24. A plug 40 is secured, as by soldering or a tight press fit, into the lower end 74 of the cripple column housing 24. A cripple column base cup 44 is slidably positioned within the cripple column housing 24 and is biased upwardly away from the plug 40 by a z-axis balance spring 42. The base cup 44 has a central base hole 46 and a flat top surface 48.

A lower column segment 52 has an upper flange 54 and an almost flat lower surface 55 with a central flange point 56 projecting from the surface 55. The upper or top end of the lower column segment 52 has a cylindrical opening 58 and a central upper point 60.

An upper column 66 segment has a lower end positioned within the opening 55 of the lower column segment 52 within the cripple column housing 24. The upper column segment 66 has a small bore 68, for receiving the upper point 60 of the lower column segment 52. The receptacle 68 is centered within a lower cylindrical section 64 on the upper column segment 66. The segment 66 has an upper neck 70. A coil spring 71 is disposed on the neck 70. The section 64 has an outer diameter smaller than the inner diameter of the opening 58 to allow the segments 52 and 66 to "cripple," that is tilt, as shown in FIG. 3, as will be described later. When this occurs, a toggle spring 100 is moved which causes a valve in the valve body to open.

As shown in FIG. 2, with the cripple column in the aligned or unbuckled condition, the surface 55 of the lower column segment 52 rests flat on the top surface 48 of the base cup 44 with the point 56 in the hole 46. The upper column segment 66 is concentrically aligned with the lower column segment 52 with the section 64 of the upper column segment 66 resting in the opening 58 with the point 60 in the base 68.

The structure and configuration of the segments 52 and 66 allow them to abut each other with the cripple column in the aligned position (as shown in FIG. 2). The upper column segment 66 balances on the lower column segment 52 (in the absence of sufficient seismic movement).

On the other hand, the cripple column "cripples," when sufficient seismic movement occurs, as shown in FIG. 3 and which will be discussed in more detail subsequently.

Referring again to FIG. 4, a neck end guide hole 76 extends through the upper end of the cripple column housing 24. A toggle housing 80 containing a toggle insert opening or receptacle 78 is attached over the cripple column housing 24. A bubble level 82 is provided on the top surface of the toggle housing 80. A ball fitting 28 having an outer ball section 84 and an inner ball section 86 is attached to the toggle housing 80. A toggle insert 90 has a lateral dove-tail slot 92. An insert guide hole 94 extends through from the bottom surface of the toggle insert 90 to the dove-tail slot 92.

A toggle spring 100 is installed within the dove-tail slot 92. The toggle spring 100 is preferably a flat 0.004 inch thick piece of spring steel and is dimensioned to lie flat within the dove-tail slot. Four guide pins 106 passing through pin holes 108 in the toggle insert 90 laterally secure the toggle spring 100 within the toggle insert. The toggle insert 90 is installed within the toggle insert receptacle or space 78 in the toggle housing 80.

As shown in FIG. 2, with the cripple column 38 in the aligned or unbuckled condition, the neck 70 of the upper column segment 66 extends through the neck end guide hole 76 at the upper end of the cripple column housing 24, and the neck end 72 extends into the insert guide hole 94 in the toggle insert 90. The spring 71 rests in a hole 95 adjacent the hole 94. The neck end 72 is slightly spaced from and does not contact the toggle spring 100 when the cripple column 38 is in the aligned or unbuckled position.

Figure 11:
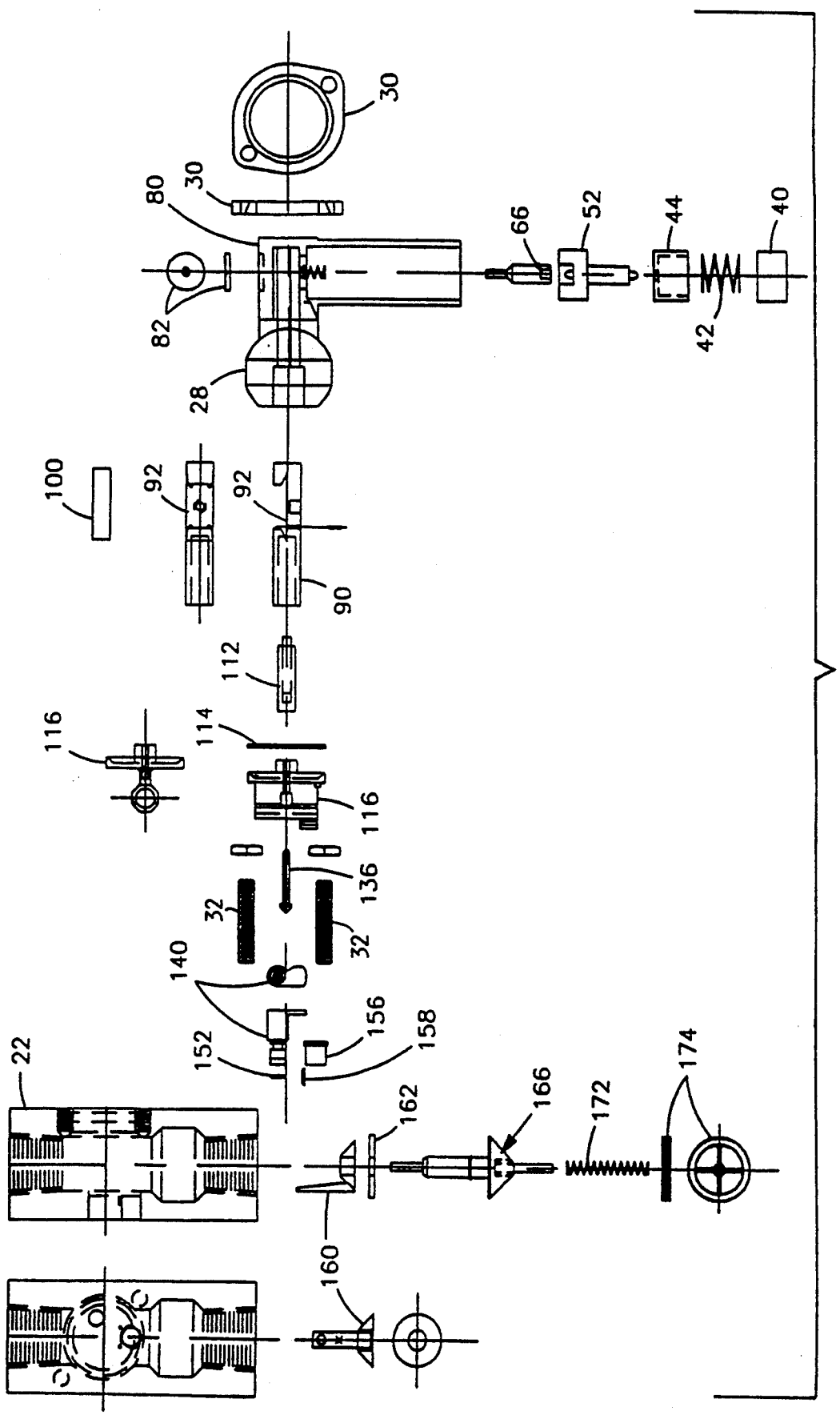
FIG. 11 is an exploded side elevation view of substantially the entire present seismic valve.

Turning to FIGS. 4, 5 and 11, a secondary latch pin 112 is slidably positioned within a secondary latch pin bore 110 longitudinally extending into the dove-tail slot 92 from the inner end 104 of the toggle insert 90. A primary latch pin guide 116 has a central shoulder 118, a body 122 and a spherical rim 120. A collar 124 is supported by a web 128 extending from the body 122 opposite to the central shoulder 118. A guide bore 126 extends through the central shoulder 118, body 122 and web 128. A primary latch pin 136 having a trapezoidal cap 138 and a pointed back end 148 is supported within the primary latch pin guide 116.

A reset cam 140 has a cam flange 144 protruding from the outside end of a cylindrical cam barrel 146. The cam flange 144 has a rounded cam surface 142. A cam head 150 attached to the cam barrel 146 has a slotted end 151 for receiving a resetting tool, e.g., a flat blade screwdriver or a coin. An o-ring 152 pivotally seals the cam head 150 against valve body 22.

Figure 8:
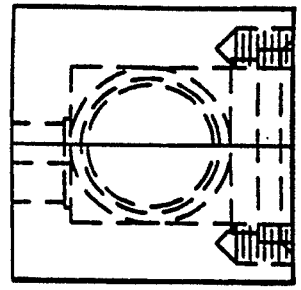
FIG. 8 is a top plan view of the valve body of FIG. 7.
Figure 6:
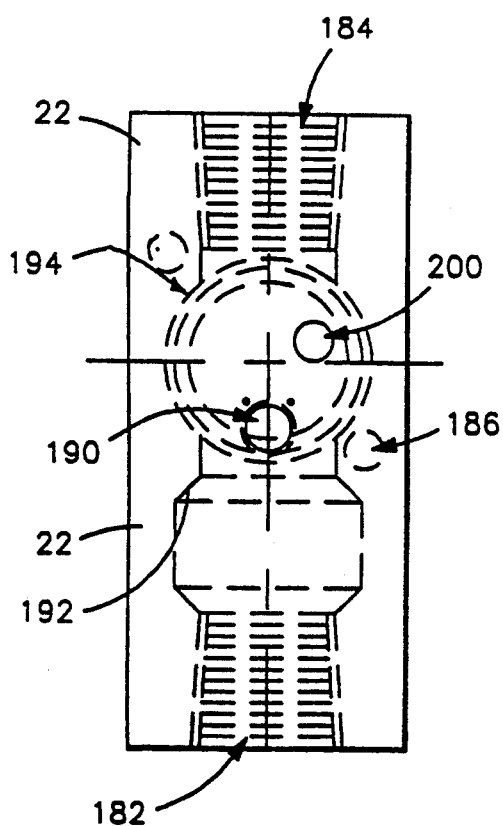
FIG. 6 is a front elevation view of the valve body.
Figure 7:
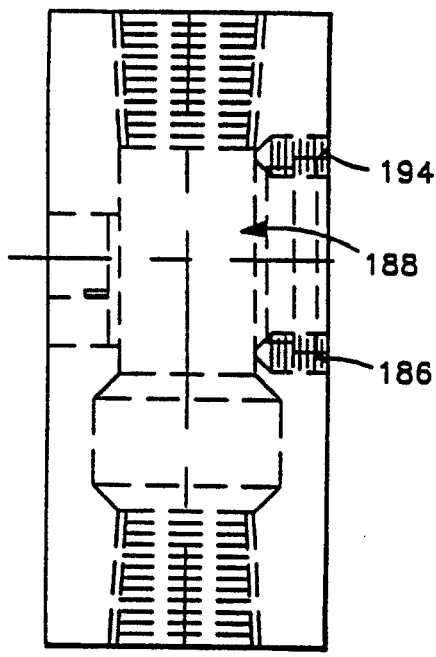
FIG. 7 is side elevation view of the valve body of FIG. 6.

Referring to FIGS. 6, 7 and 8, the valve body 22 has a threaded inlet 182 and a threaded outlet 184 coaxial with the inlet 182. A cam bore 200 extends into a primary latch pin guide recess 188 in the valve body 22. The cam barrel pivotally fits within the cam bore. Preferably a spring is attached to the reset cam 140 and valve body 22 to bias the cam flange upwardly, towards the outlet 184.

The primary latch pin guide 116 is positioned within the recess 188 with the collar 124 preferably coaxial with the inlet 182 and outlet 184. An annular valve seat 192 within the valve body 22 is located, below the primary latch pin guide recess 188. Threaded stud holes 186 extend partially into the valve body 122. A spherical ball seat 194 in the valve body 22 surrounds the primary latch pin guide recess 188. A viewing window 156 is sealed within a view port 190 in the valve body 22 to allow the open or closed condition of the valve to be determined by visual inspection.

Figure 9:
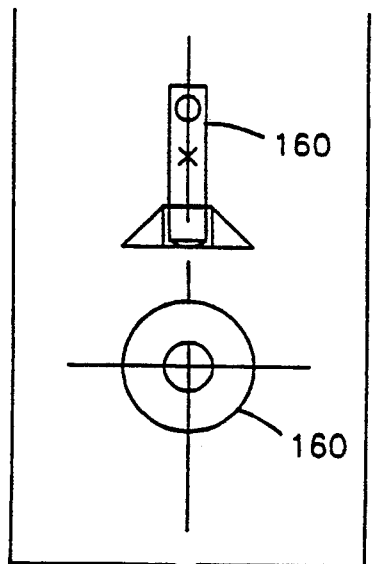
FIG. 9 is a front elevation view and a bottom plan view of a valve indicating flag.
Figure 10:
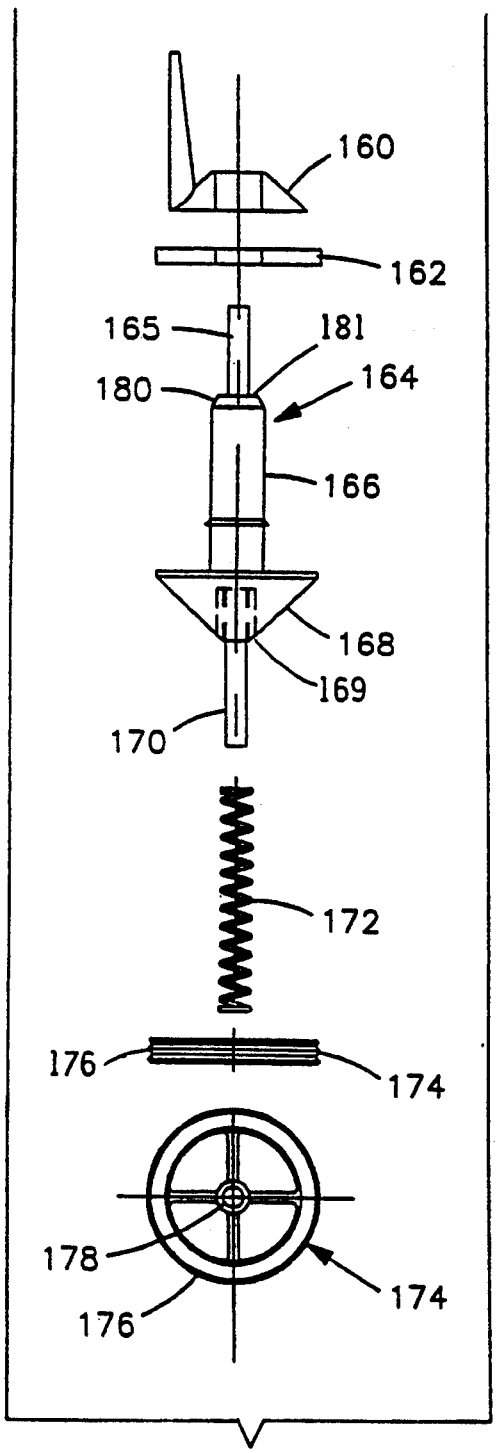
FIG. 10 is an exploded side elevation view of valve components within the valve body.

Referring to FIGS. 9 and 10, a poppet valve 164 has a top stem 165, a body 166, a dome 168 and a bottom stem 170 extending below the dome. An elastomeric seal ring 162 preferably of teflon around the body 166 is supported on the flat top of the dome 168. A flag 160 around the body 166 and on top of the seal ring 162 provides valve ON and OFF indications. The top stem 165 joins the body 166 at a bevelled shoulder 180, which is engaged by the cap 138 of the primary latch pin 136. A closure spring 172 is slidably positioned over the bottom stem 170 of the poppet valve 164 and into a bore 169. A spider guide 174 has its outer surface 176 threaded to engage the inlet 182 of the valve body 22. A shaft guide 178 at the center of the spider guide 174 slidably receives and radially supports the bottom stem 170 of the poppet valve 164. The stem 166 passes through and is laterally supported by the collar 124 of guide 116. The closure spring 172 is contained around and axially compressed on the bottom stem in between the shaft guide 178 and the annular bore 169 in the dome.

Figure 12:
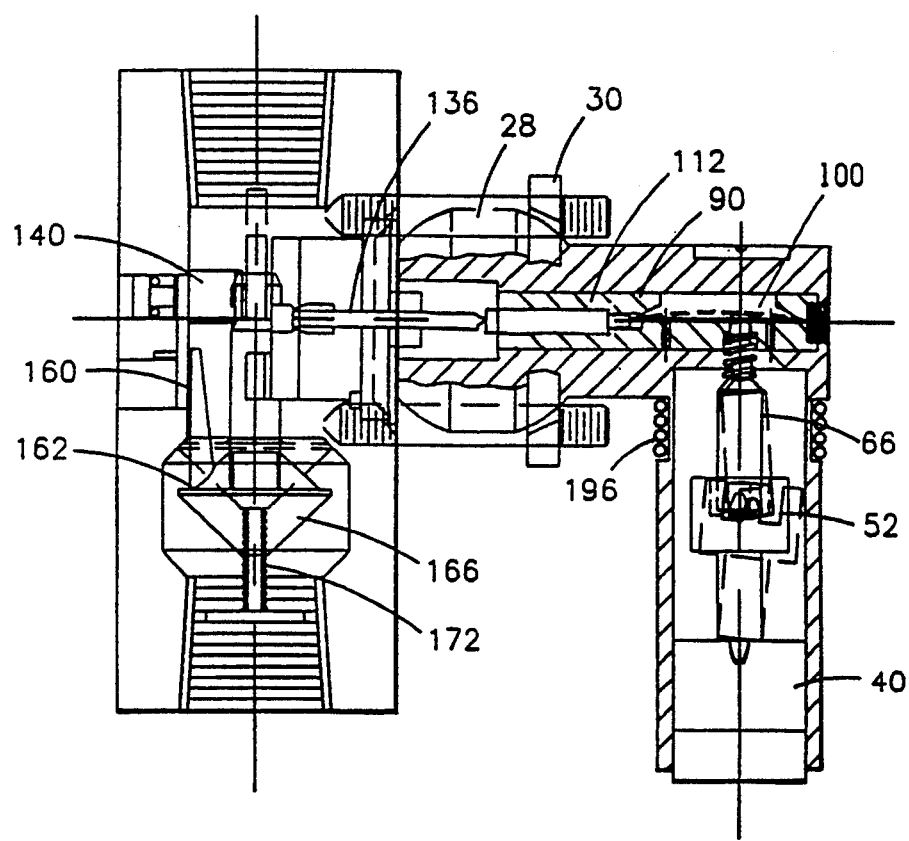
FIG. 12 is a side elevation view in part section showing the open and closed positions of the present valve in solid and phantom lines, respectively.

As shown in FIGS. 1 and 12, the valve body 22 is pivotally attached to the toggle housing 80 by threaded studs 32 and nuts 34 which clamp the clamp ring 30 against the outer ball section 84. Correspondingly the inner ball section 86 is held against the rim 120 of the primary latch pin guide 116 and the ball seat 194, in the valve body 22.

In use, the valve unit 20 is installed by connecting pipe ends of e.g., a gas pipe 36, to the inlet 182 and outlet 184 of the valve body 22. If the pipe 36 is vertically plumb, the cripple column 24 is positioned purely perpendicularly to the pipe 36 and valve body 22, as shown in FIG. 1. In situations where the pipe 36 is not vertically plumb (i.e., where the pipe 36 extends at an angle in the x-y plane as indicated in FIG. 1) and thus the valve body 22 is not vertical, the nuts 30 are loosened and the toggle housing 80 and column 24 are swiveled to a position where the cripple column housing 24 is vertically plumb, as indicated by the bubble level 82. The nuts 30 are then retightened clamping the toggle housing 80 to the valve body. The spherical surfaces of the outer ball section 84 and inner ball section 86 sliding against complimentary surfaces on the clamp ring 30 and on the ball seat 194 allow the cripple column housing 24 to be vertically leveled even though the pipe 36 may not be vertically plumb.

With the valve installed and in the open position, as shown in FIG. 2, the segments 52 and 66 of the cripple column 38 are aligned and the toggle spring 100 lies flat in the dove-tail slot 92. The ends of the primary latch pin 136, secondary latch pin 112 and toggle spring 100 abut each other causing the cap 138 of the primary latch pin 136 to push against the poppet valve 164, thereby holding the poppet valve 164 open. Specifically, the cap 138 engages the top stem 165 and shoulder 180 of the poppet valve 164, thereby preventing the valve from moving upwardly despite the upward force exerted on the valve by the closure spring 172. The upward force of the closure spring on the poppet valve, through the interaction of the shoulder 180 and cap 138, forces the latch pins 136 and 112 (to the right in FIG. 12) towards the toggle housing. However, the pins are held in position by the toggle spring which when flat has sufficient column strength to resist bowing or buckling caused by the force originating from the closure spring.

During an earthquake, shock or vibration forces disturb the balance of the cripple column and cause it to buckle into a position such as shown in FIG. 3. As the cripple column 38 buckles, the end 72 moves upwardly through the insert guide hole 94 and pushes against the toggle spring 100. The geometry of the upper and lower cripple column segments, i.e., the flat surfaces and points and receptacles, cause upward movement of the neck end 72 with buckling of the cripple column 38.

As the neck end 72 pushes against the toggle spring 100, the column strength of the toggle spring 100 is lost and the toggle spring bows upwardly into the position shown in FIG. 3 and in phantom lines in FIGS. 12. Consequently, the resisting force holding the primary latch pin 136 against the poppet valve 164 is greatly reduced. The primary latch pin 136 and secondary latch pin 112 shift (to the right in FIG. 12) with the bowing of the toggle spring 100, due to the spring driven angled or wedged interaction of the poppet valve on the primary latch pin. The poppet valve 164, having pushed the cap of the primary latch pin 136 off of the shoulder 180, then shifts upwardly in the valve body 22 driven by the closure spring 172. The seal ring 162 seals against the valve seat 192 shutting off flow through the valve body 22. The flag 160 shifts upwardly with the poppet valve 164 such that the OFF indication of the flag 160 is visible through the viewing window 156.

The secondary latch pin 112 as shown in FIG. 4, also includes a bore into which is inserted a low melting alloy pellet 97, such as solder, that is then followed by a pin 96. The pellet acts as a thermal sensor, that is, if the assembly gets too hot, as in the case of a fire, the solder pellet 97 will melt allowing pin 96 to move into pin 112 to thereby cause the valve 164 to close.

To reset the valve unit 20, a resetting tool such as a screwdriver or even a coin is inserted into the slotted end of the cam head 150. As the tool is rotated, the cam surface 142 on the cam flange 144 pushes on the shoulder 181 of the poppet valve 164 and drives the valve 164 downwardly passed the reset or open position. The primary latch pin 136 and the secondary latch pin 112 are driven by the toggle spring 100 allowing the toggle spring 100 to resume a flat locking position. In this position, the cap 138 of the primary latch pin 136 is in position to engage the surface 180 of the body 166 when the pressure is released from the reset cam 146. The toggle spring 100 thus returns to its original flat position within the dove-tail slot 92 to maintain the primary latch pin 136 in engagement to the poppet valve. As the flag 160 moves down with valve 164, the ON indication of the flag moves into alignment with the viewing window 156. The resetting tool is removed and the cam spring 198 swings the cam flange up to its initial position. The segments of the cripple column 38 are automatically realigned by gravity, and the valve unit 20 is then reset and ready to operate during the next earthquake.

The cripple column 38 can operate in the z-axis to deflect the toggle spring 100 with the aid of the z-axis balance spring 42. A vertical jolt will cause bouncing of the cripple column segments sufficient to deflect the toggle spring, even if the segments do not buckle.

In case of fire near the valve unit 20, the low melting alloy 97 which abuts against pin 96 acts as a thermal plug and allows the primary latch pin 136 and secondary latch pin 112 to shift and release the poppet valve 164, thereby stopping flow through the valve body 22. In addition, if the seal ring 162 melts in a fire, the poppet valve 164 will seal against the valve seat 192 with a metal to metal seal, to seal off or at least limit flow.

As shown in FIG. 12, a solenoid coil 196 may be provided around the cripple column housing 24. The valve unit 20 can then be closed by buckling the cripple column by activating the solenoid coil 196, which can be wired to a fire detection system, pressure switch, panic buttons or other safety systems.

The cripple column 38 provides a seismic sensor which is extremely stable and will react to shock impulses in the x, y and z directions. The flange 54 provides suitable mass to allow proper operation according to current criteria, namely the column to cripple at a 0.3 G force in 0.4 seconds and not cripple at a 0.4 G force in 0.1 second (heavy truck, train, etc. passing).

The valve unit 20 is versatile since the ball surfaces allow the cripple column housing 24 to be leveled even with the valve body 22 attached to a non-vertical pipe 36. Since the inlet and outlet of the valve body 22 are coaxial and aligned, and the valve has a dome 168, pressure losses through the valve body 22 are reduced. The valve body/poppet valve design is suitable for high pressure systems and sealing function is maintained even in a fire. The seal areas are minimized to help prevent leaks. All sensing equipment, seals and inspection windows are on the shut off side of the valve, and are not under pressure when the valve is closed. If the valve unit is tampered with, flow will be shut off before a leak occurs.

Thus, while a preferred embodiment of the invention has been shown and described, it will apparent to those skilled in the art that various changes and modifications may be made to the invention without departing from the spirit or scope of the following claims.

We claim:

1. A seismic valve comprising:
   a valve body;
   a valve within the valve body;
   a cripple column attached to the valve body;
   closing means for urging the valve to a closed position within the valve body;
   holding means for holding the valve in an open position against the urging of the closing means, the holding means releasable from the valve with buckling of the cripple column, and
   means for causing the cripple column to lengthen as it moves from an unbuckled to a buckled condition.

2. A seismic valve comprising:
   a valve body;
   a valve within the valve body;
   a cripple column attached to the valve body;
   closing means for urging the valve to a closed position within the valve body;
   holding means for holding the valve in an open position against the urging of the closing means, the holding means releasable from the valve with buckling of the cripple column wherein the holding means comprises a toggle spring overlying the cripple column and at least one pin positioned between the valve and the toggle spring.

3. The seismic valve of claim 2 wherein the pin provides a thermal plug.

4. A shutoff valve comprising:
   a cripple column responsive to seismic movement;

a toggle spring overlying the cripple column and displaceable to a deformed condition from an undeformed condition by the cripple column;

a valve body;

attachment means for attaching the cripple column to the valve body;

a valve supported within the valve body;

biasing means for biasing the valve into a closed position with the body; and linkage means for linking the toggle spring to the valve with the toggle spring in the undeformed position holding the valve, through the linkage means, into an open position within the valve body against force of the biasing means and with the toggle spring in the deformed position releasing the linkage means from the valve, thereby allowing the valve to move into the closed position under force of the biasing means.

5. The shutoff valve of claim 4 wherein the cripple column comprises an upper segment supported on a lower segment within a cripple column housing and wherein the upper and lower segments are displaceable by seismic movement from an aligned position to a non-aligned position, with the upper and lower segments having a longer combined length in the non-aligned position than in the aligned position.

6. The shutoff valve of claim 4 wherein the cripple column comprises means for increasing in length in response to seismic movement.

7. The shutoff valve of claim 4 further comprising a thermal plug in the linkage means.

8. The shutoff valve of claim 4 wherein the attachment means comprises a ball section and a clamp ring which allows the cripple column to be vertically aligned independently of the orientation of the valve body.

9. The shutoff valve of claim 4 wherein the linkage means comprises pin means engageable to the valve.

10. The shutoff valve of claim 4 further comprising a fusible seal ring on the valve.

11. The shutoff valve of claim 4 further comprising a reset cam pivotally mounted in the valve body for resetting the valve from the closed position to the open position.

12. The shutoff valve of claim 5 further comprising wire coil windings around the cripple column for crippling the cripple column.

13. The shutoff valve of claim 6 wherein the means for increasing in length comprises:

a base having a generally flat top surface;

a first segment having a lower end engageable against the top surface of the base; and a second segment supported on the first segment.

14. The shutoff valve of claim 13 further comprising an enlarged flange on the first segment to provide added mass to the cripple column.

15. The shutoff valve of claim 8 further comprising a Z-axis balancing spring acting on the cripple column.

* * * * *